(12) United States Patent
Novak et al.

(10) Patent No.: US 10,795,747 B2
(45) Date of Patent: Oct. 6, 2020

(54) FILE SYNCHRONIZING SERVICE STATUS MONITORING AND ERROR HANDLING

(71) Applicant: Microsoft Technology Licensing, LLC, Redmond, WA (US)

(72) Inventors: Michael J. Novak, Redmond, WA (US); Ping Xie, Redmond, WA (US); Jack A. Nichols, Bothell, WA (US); Valeh Valiollah Pour Amiri, Bellevue, WA (US); Ioannis Giannoumis, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 337 days.

(21) Appl. No.: 15/982,905

(22) Filed: May 17, 2018

(65) Prior Publication Data

US 2019/0354427 A1    Nov. 21, 2019

(51) Int. Cl.
| | |
|---|---|
| *G06F 11/00* | (2006.01) |
| *G06F 11/07* | (2006.01) |
| *G06F 3/06* | (2006.01) |
| *G06F 16/11* | (2019.01) |
| *G06F 16/178* | (2019.01) |

(52) U.S. Cl.
CPC ........ *G06F 11/0772* (2013.01); *G06F 3/0643* (2013.01); *G06F 3/0653* (2013.01); *G06F 16/122* (2019.01); *G06F 16/178* (2019.01)

(58) Field of Classification Search
CPC ........ G06F 16/10; G06F 16/16; G06F 16/113; G06F 16/178; G06F 16/1794; G06F 16/1787
See application file for complete search history.

(56) References Cited

U.S. PATENT DOCUMENTS

| | | | | | |
|---|---|---|---|---|---|
| 6,035,324 | A | * | 3/2000 | Chang | H04L 29/06 709/203 |
| 6,631,409 | B1 | * | 10/2003 | Watson | H04L 43/00 709/223 |
| 7,155,521 | B2 | * | 12/2006 | Lahti | H04L 67/1095 709/227 |
| 7,404,003 | B1 | * | 7/2008 | Noble | H04L 67/06 709/203 |

(Continued)

*Primary Examiner* — Bryce P Bonzo
*Assistant Examiner* — Jeison C Arcos
(74) *Attorney, Agent, or Firm* — Fiala & Weaver P.L.L.C.

(57) ABSTRACT

Systems, methods, and apparatuses are disclosed for file synchronizing service status monitoring and error handling. A client device includes a local file system access manager that includes a status interface. The status interface is configured to receive a status message from a client-side sync manager of the client device. The client-side sync manager that communicates with a server-side sync manager at a server to synchronize data objects between file systems of the client device and server. The status message corresponds to a state of the client-side sync manager during a multi-stage start-up process for the client-side sync manager. A status caller in an application of the client device can retrieve the status message from the status interface. The status message can also be provided to a user interface for display to a user of the client device, and/or to a telemetry server for use in improving the file synchronizing service.

20 Claims, 7 Drawing Sheets

(56) References Cited

U.S. PATENT DOCUMENTS

| | | | |
|---|---|---|---|
| 8,200,773 B2* | 6/2012 | Bluestone | G06F 21/53 709/217 |
| 2001/0032255 A1* | 10/2001 | Matsuki | H04L 67/42 709/219 |
| 2003/0101329 A1* | 5/2003 | Lahti | H04L 67/02 712/1 |
| 2004/0205263 A1* | 10/2004 | Sivaraman | H04W 4/50 710/21 |
| 2004/0220702 A1* | 11/2004 | Matsubara | H02J 3/14 700/291 |
| 2006/0271600 A1* | 11/2006 | Goh | G06Q 10/06 |
| 2008/0005321 A1* | 1/2008 | Ma | H04L 41/0893 709/224 |
| 2008/0010306 A1* | 1/2008 | Nagai | G03G 15/55 |
| 2009/0177800 A1* | 7/2009 | Gidron | H04L 67/1095 709/248 |
| 2009/0288143 A1* | 11/2009 | Stebila | H04L 9/0844 726/3 |
| 2010/0325259 A1* | 12/2010 | Schuler | G06F 11/3006 709/224 |
| 2010/0325279 A1* | 12/2010 | Heim | G06F 9/5077 709/226 |
| 2012/0150943 A1* | 6/2012 | Mukundan | G06F 9/542 709/203 |
| 2012/0216112 A1* | 8/2012 | McInerney | G06F 16/10 715/255 |
| 2014/0201145 A1* | 7/2014 | Dorman | G06F 16/27 707/634 |
| 2014/0379648 A1* | 12/2014 | Chiu | G06F 16/178 707/624 |
| 2018/0260125 A1* | 9/2018 | Botes | G06F 3/0617 |
| 2019/0332596 A1* | 10/2019 | Gammans | G06F 16/2358 |
| 2020/0050588 A1* | 2/2020 | Bhogal | G06F 16/1787 |
| 2020/0117682 A1* | 4/2020 | Suthar | G06F 16/2358 |

\* cited by examiner

FILE SYNCHRONIZING SERVICE STATUS MONITORING AND ERROR HANDLING

BACKGROUND

File hosting, synchronizing, and sharing services are file synchronizing services that automatically synchronize folders and their contents over multiple computing devices. A user may create a folder on each of their computing devices. The file synchronizing service synchronizes the folder such that synchronized copies of the same folder (and its contents) appear on each of the computing devices. Furthermore, a copy of the folder may be maintained at the file synchronizing service itself, which the user may access using a web browser or other application. Files placed in the folder may also be easily shared with other users for viewing or collaboration. Examples of such file synchronizing services include Dropbox®, Google® Drive™, and Microsoft® OneDrive®.

Files in synchronized folders in storage of a computing device local to a user can be accessed by the user and applications through the computing device's local file system access manager. Errors may occur, however, if the files are attempted to be accessed before the client-side portion of the file synchronizing service is fully running on the computing device.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses provide for status monitoring and error handling for a file synchronizing service, including enabling providing of status of the client-side sync manager of the file synchronizing service, and notification of errors that occur even when the client-side portion of the file synchronizing service is not fully running.

In one aspect, a local file system access manager includes a status interface configured to receive a status message from a client-side sync manager of a client computing device. The client-side sync manager communicates with a server-side sync manager at a server to synchronize data objects stored in a file system of the client device with data objects stored in a file system of the server. The status message corresponds to a state of the client-side sync manager during a multi-stage start-up process for the client-side sync manager, including providing a status prior to the client-side sync manager being fully connected to the local file system access manager. A status caller in an application of the client can retrieve the status message from the local file system access manager. Furthermore, the status interface may provide status information regarding the received status message to one or more other entities, such as a user interface of a user interface manager (of an operating system) running on the client device, a telemetry destination server, and/or other entity, local or remote to the client device.

Further features and advantages of the systems and methods, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present methods and systems and, together with the description, further serve to explain the principles of the methods and systems and to enable a person skilled in the pertinent art to make and use the methods and systems.

Figure 1:
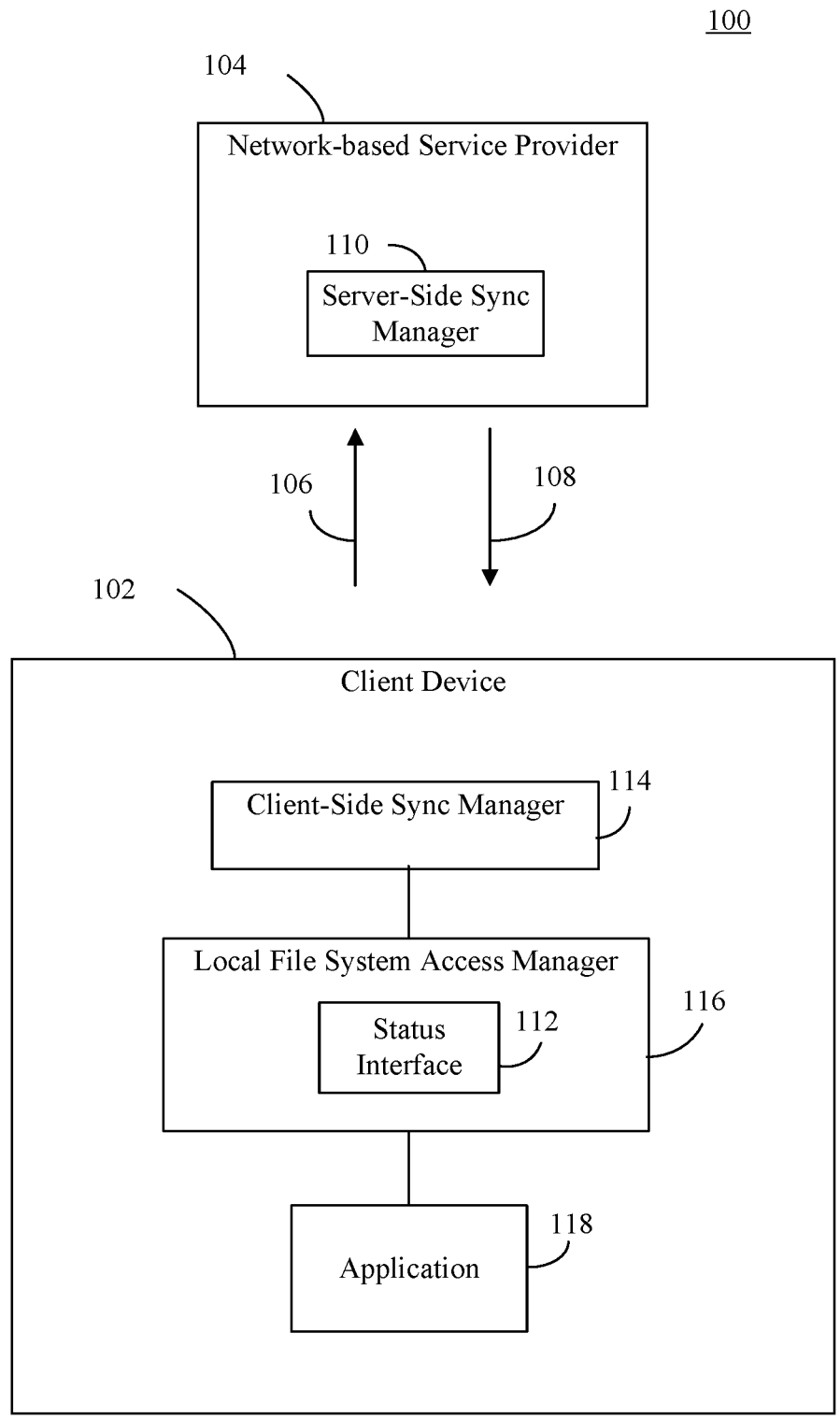
FIG. 1 is a block diagram of a networked system that includes a computing device configured to generate status messages indicating a status of a client-side sync manager, in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Introduction

The present specification and accompanying drawings disclose one or more embodiments that incorporate the features of the present methods and systems. The scope of the present methods and systems is not limited to the disclosed embodiments. The disclosed embodiments merely exemplify the present methods and systems, and modified versions of the disclosed embodiments are also encompassed by the present methods and systems. Embodiments of the present methods and systems are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

The example embodiments described herein are provided for illustrative purposes, and are not limiting. The examples described herein may be adapted to any type of method or system for cloud files error handling. Further structural and operational embodiments, including modifications/alterations, will become apparent to persons skilled in the relevant art(s) from the teachings herein.

Numerous exemplary embodiments are described as follows. It is noted that any section/subsection headings provided herein are not intended to be limiting.

Embodiments are described throughout this document, and any type of embodiment may be included under any section/subsection. Furthermore, embodiments disclosed in any section/subsection may be combined with any other embodiments described in the same section/subsection and/ or a different section/subsection in any manner.

Example Embodiments

File hosting, synchronizing, and sharing services, referred to herein as file syncing services, automatically synchronize folders and their contents over multiple computing devices. A user may create a folder on one of their computing devices. The file syncing service synchronizes the folder (and its contents) such that synchronized copies of the same folder appear on each of the computing devices. Furthermore, a copy of the folder may be maintained at the file syncing service itself, which the user may access using a web browser or other application. Files placed in the folder may also be easily shared with other users for viewing or collaboration. Examples of such file syncing services include Dropbox®, Google® Drive™, and Microsoft® OneDrive®.

A file system access manager manages requests by applications for objects stored in a file system managed by the access manager. The file system access manager (also referred to as a "filter") is typically implemented at a computing device by an operating system such as Microsoft Windows®, Apple Mac OS® X, Google Android™, and Linux®. For local files synchronized by a file syncing service to network-based storage, a file system access manager is used to process requests from local applications for objects stored in the network storage by the network storage provider. In particular, the file system access manager may communicate with a client-side portion of the file syncing service, referred to as a client-side sync manager, to access the synchronized objects. A server-side sync manager of the file syncing service manages synchronized storage of objects in the network-based storage of a server, and communicates with the client-side sync manager to synchronize the objects between the client and server devices. Note that a provider of network-based storage may be referred to as a "cloud storage provider" if the network-based storage is accessible over the Internet.

Embodiments described herein relate to improving communications between file syncing services and the local file access managers/platforms, including providing a status of the client-side sync manager even when the client-side sync manager is not fully operational (e.g., is running but not yet connected to the local file system access manager).

For instance, a "hydrated" file is a synchronized file present in local storage in its entirety. Likewise, a "hydrated" directory is a synchronize directory present in local storage in its entirety. However, a file or a folder may alternatively be represented in local storage as "dehydrated," meaning the file or folder is not present in local storage in its entirety, though it is stored in its entirety in network-based storage. Instead, the dehydrated file or folder is stored in local storage in the form of metadata (e.g., a file or folder identifier, a file or folder size indication, an indicated date of access, etc.) representative of the file or folder. Such metadata typically represents the file or folder in local storage in a much more compact form, saving storage space. Conventionally, a user or application attempting to interact with a dehydrated file or folder may encounter an error, such as a "PROVIDER NOT RUNNING" error. The client-side sync manager can be running for quite some time before completing its start-up routine and being fully connected to the local file system access manager. It would be beneficial for a system to be able to disambiguate between some portion of the file syncing service not actually running and the client-side sync manager being in a startup stage of a multi-stage startup process. Once the client-side sync manager is fully started and connected to the local file system access manager, the file syncing service can provide meaningful errors in response to failures. However, prior to this time, conventional systems have no way of providing information to the local platform (the client's operating system) regarding the status of the client-side sync manager or the server-side sync manager of the file syncing service.

Embodiments enable improved communication of status, including errors, between the client-side sync manager and applications such as the local file system access manager. Telemetry around the hydration processes performed by the sync manager is also improved, which enables the local platform to have better knowledge of the network-based provider's state and more granularity around the errors during the startup process of the client-side sync manager. In accordance with an embodiment, the client-side sync manager can use an application programming interface (API) (e.g. "CfReportSyncStatus" API) to send status updates to the local file system access manager of the local platform. Applications running on the local platform can then use these status updates for diagnosing problems, or the status updates may be sent via telemetry to a remote service for tracking and/or diagnosing problems. In various embodiments, the local platform can define a set of generic errors for use by all file syncing services and, in addition, allow the network-based providers to pass customized error messages (e.g. "This file cannot be downloaded outside of your enterprise's network") to the user if they desire. This significantly improves communication between the file syncing service and the platform which allows for better diagnosis of errors such as hydration errors. Thus, in accordance with an embodiment, the platform (e.g. Windows®) can determine a meaningful state about the provider (e.g. OneDrive®) when the provider is not yet fully connected to the local file system access manager.

If a hydration error occurs when the provider is fully connected to the local file system access manager, an error message can be transmitted from the file syncing service to the local platform using established error telemetry. For example, an application in the client device may call for hydration of a placeholder (e.g., OS calls "CfHydratePlaceholder"). If a hydration error occurs and the client-side sync manager is fully connected to the local file system access manager, the client-side sync manager returns a status message through the established channel, which may be directly between the client-side sync manager and the calling application. However, prior to connection to the local file system access manager, the primary channels between the file syncing service and local platform are not available. Without ready access to better error messages during a multi-stage startup process of the client-side sync manager, diagnosing issues may require a large and time-consuming amount of manual investigation of the local platform and file syncing service logs to determine the cause of any problems. Embodiments overcome these and other issues, enabling status messages to be provided by the file syncing service during time periods (e.g., client-side sync manager startup) not possible in conventional systems.

Note that although "files" are frequently referenced herein, embodiments are directed to any file system objects, including files and folders, as well as artifacts of files, such as thumbnails and other visualizations of content. Note that "data object" and "file system object," as used herein, each encompass files, folders, artifacts of files, and other file system objects.

Embodiments enable status messages for a sync client to be provided in a variety of manners. For example, FIG. 1 is a block diagram of a networked system 100 that includes a computing device 102 configured to generate status messages indicating a status of a client-side sync manager 114, in accordance with an example embodiment. As shown in FIG. 1, system 100 includes client device 102, and a network-based service provider 104. Client device 102 includes a local file system access manager 116 containing a status interface 112, a client-side sync manager 114, and an application 118. Network-based service provider 104 includes a server-side sync manager 110. These features of system 100 are described as follows.

Network-based service provider 104 provides access to objects and resources stored in a file system managed by network-based service provider 104. Network-based service provider 104 may be hosted in one or more servers, a personal computer, one or more virtual machines, or any other type of computing device or application. Network-based service provider 104 includes file hosting and synchronizing services that automatically synchronize folders and their contents over multiple computing devices. A user may create a folder on each of their computing devices, including client device 102. Network-based service provider 104 synchronizes the folders such that synchronized copies of the same folder appear on each of the computing devices. Furthermore, a copy of the folder may be maintained at the file syncing service itself, which the user may access using a web browser or other application. Files placed in the folder may also be easily shared with other users for viewing or collaboration. Examples of such file syncing services include Dropbox®, Google® Drive™, and Microsoft® OneDrive®.

Server-side sync manager 110 in network-based service provider 104 receives requests 106 for data objects (e.g., files, folders, file artifacts, and other file system objects) from a remote sync client, such as client-side sync manager 114. The objects may be stored in a file system associated with server-side sync manager 110, and copies thereof may be transmitted by server-side sync manager 110 to a remote client, such as client device 102, that receives the data. The data may include metadata representative of the objects (e.g., file/folder identifiers, file/folder sizes, etc.) and/or may include the objects for hydration at the client. Server-side sync manager 110 may be any type of server-side sync manager, including a file-sharing/syncing service server-side application, proprietary or commercially available, such as the server-side portions of Dropbox®, Google® Drive™, Microsoft® OneDrive®, etc.

Client device 102 is used to run applications that access data objects stored and managed by network-based service provider 104. Client device 102 may be any type of stationary or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), a stationary computing device such as a desktop computer or PC (personal computer), a gaming system (Xbox®), etc. Client device 102 sends data object requests 106 to network-based service provider 104 and in response receives responsive data 108. For a particular request, responsive data 108 may include a copy of a requested data object or part of a data object (e.g., data object metadata) stored by network-based service provider 104.

Requests 106 transmitted by client device 102 and responsive data 108 transmitted by network-based service provider 104 may be communicated over any type of suitable wireless and/or wired communication channels such as IP (Internet protocol), cellular, wi-fi, etc. For example, network-based service provider 104 and client device 102 may each be included in a respective computing device (or respective set of computing devices) that are communicatively coupled via a network. The network may comprise any type of communication links that connect computing devices and servers such as, but not limited to, the Internet, wired or wireless networks and portions thereof, point-to-point connections, local area networks, enterprise networks, and/or the like.

Client-side sync manager 114 in client device 102 synchronizes objects stored at network-based service provider 104 with objects stored in a local storage of client device 102 and managed by local file system access manager 116. In addition, client-side sync manager 114 produces status messages during a multi-stage startup routine of client-side sync manager 114 that each indicate a state of client-side sync manager 114 during the startup process. Client-side sync manager 114 may be any type of sync manager, including a file-sharing/syncing service client-side application, proprietary or commercially available, such as the Dropbox® client, Google® Drive™ client, Microsoft® OneDrive® client, etc. Client-side sync manager 114 can be running for quite some time before connecting to local file system access manager 116. In prior systems, all states before the mounting of the sync roots returned a "PROVIDER NOT RUNNING" error message. Embodiments disclosed herein disambiguate between the cloud storage provider not actually running and various startup stages of client-side sync manager 114 when hydrations fail.

Local file system access manager 116 of client device 102 manages access to files stored in a local file system of client device 102. Local file system access manager 116 also manages local access to synchronized copies of data objects maintained by network-based service provider 104. During its startup routine, client-side sync manager 114 connects to local file system access manager 116 to enable access to the synchronized data objects.

Status interface 112 receives and stores status messages from client-side sync manager 114 prior to client-side sync manager 114 being fully connected to local file system access manager 116. Status interface 112 is configured to receive a status message from client-side sync manager 114 that corresponds to a state of client-side sync manager 114 during a multi-stage start-up process. Status interface 112 is further configured to provide status information of the received status message to other entities, such as application 118. Upon receiving a request for a status update, status interface 112 in local file system access manager 116 provides the requesting entity with status information extracted from the status message. The maintaining of status messages by status interface 112 enables the file syncing service represented by server-side sync manager 110 and client-side sync manager 114 to pass custom error messages to applications, that may in turn present the error messages to the user.

As such, status interface 112 may include a communication interface, such as an API (e.g., a status notification API), for receiving status messages from client-side sync manager 114. Status interface 112 is configured to store such status messages in memory or storage of client device 102. Such status messages may be stored individually, or in a common file (e.g., a log file) with time stamps, and/or further information). Status interface 112 is further configured to receive requests from applications for status of client-side sync manager 114. Such requests may be received according to any form or protocol. For instance, status interface 112 may include a second API (e.g., status access API) to which the applications may issue API calls for the status of client-sync manager 114. In response to the API calls, status interface 112 may provide at least information from the latest received status message from client-side sync manager 114, and optionally information of previously received status messages.

Client device 102 executes any number of applications such as application 118. Application 118 may be any type of application (e.g., an operating system) that executes on client device 102, and that may request a status regarding client-side sync manager 114 of client device 102. For example, in one embodiment, prior to the client-side sync manager 114 being fully connected to local file system access manager 116, application 118 may request a file from local file system access manager 116 and receive an error (e.g. "PROVIDER NOT RUNNING") that indicates that client-side sync manager 114 has not fully connected to local file system access manager 116. For instance, the "shell" (operating system or "OS") may call a primary error API, and the primary error API may return the "PROVIDER NOT RUNNING" error. In response to receiving the error, the application 118 determines that client-side sync manager 114 has not fully connected to local file system access manager 116 and that any available status updates are stored in status interface 112. Application 118 then accesses status interface 112 to retrieve the most recent status information from status interface 112, where it has been placed by client-side sync manager 114 (e.g., the OS retrieved the extended error via a secondary error API). In an embodiment, application 118 may be a user interface manager of the OS of client device 102, and configured to receive and display the status information on a graphic user interface (GUI).

Figure 2:
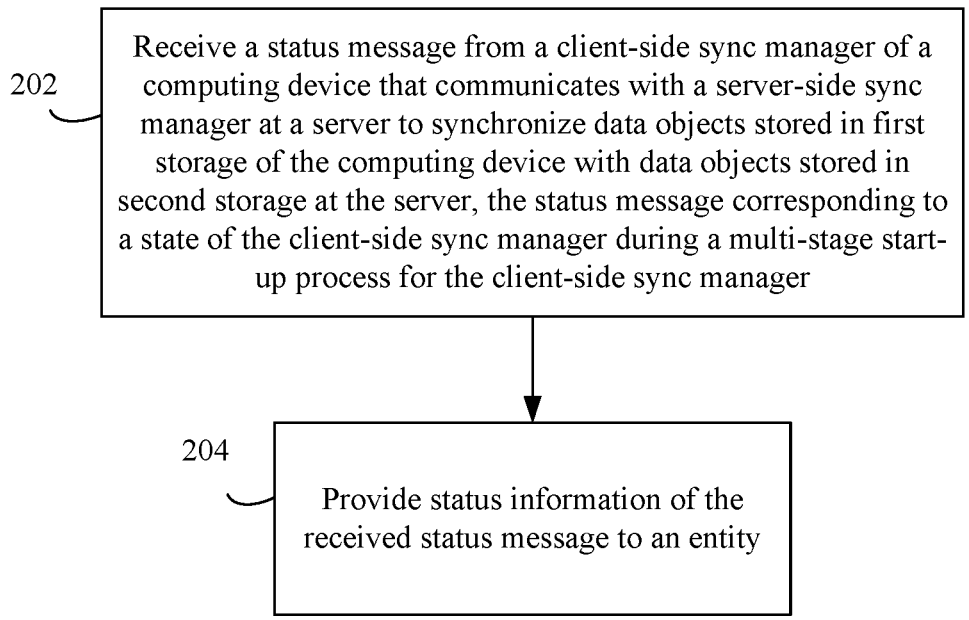
FIG. 2 is a flowchart of a computer-implemented method of providing status messages regarding a client-side sync manager, in accordance with an example embodiment.
Figure 3:
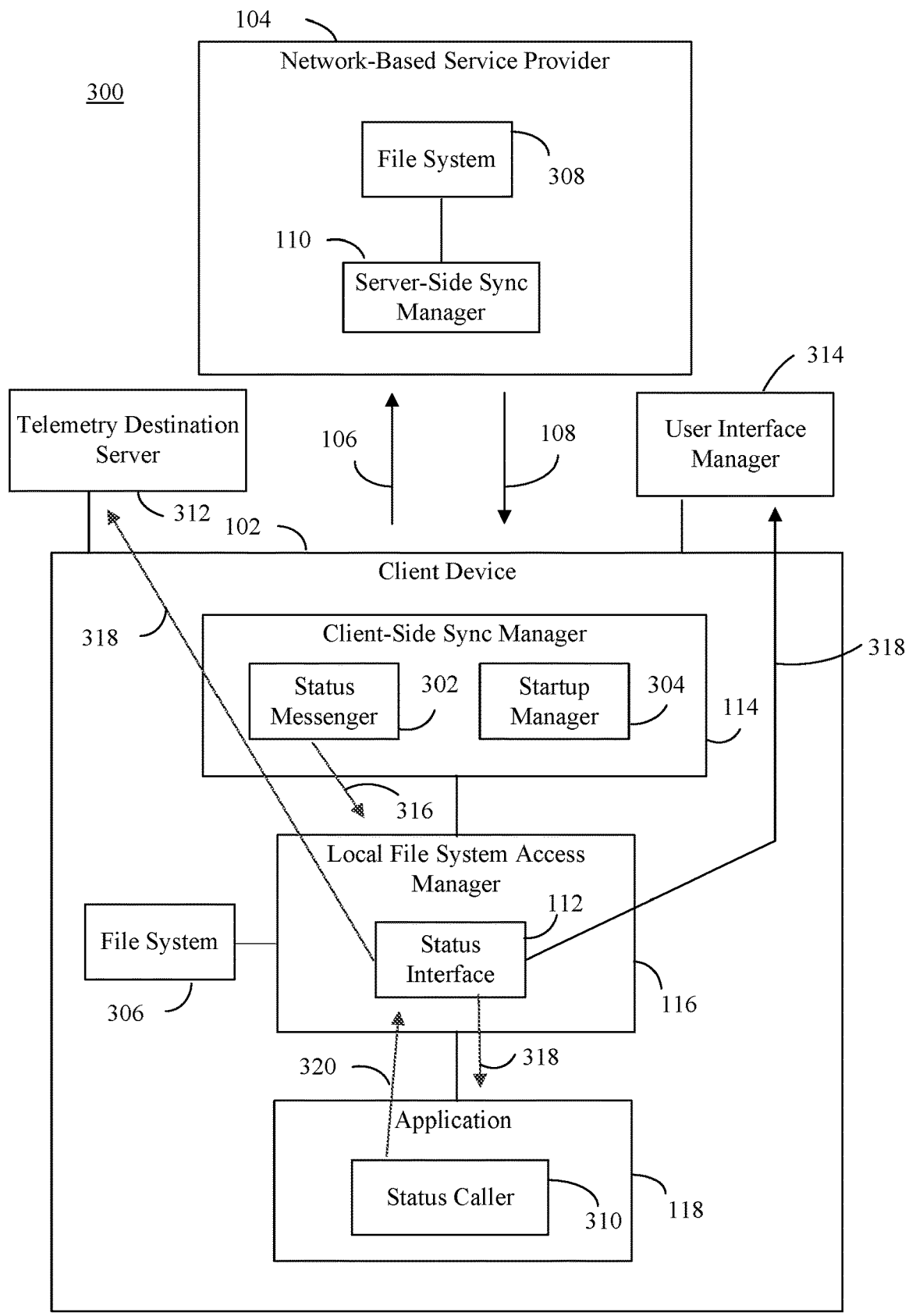
FIG. 3 is a block diagram of a networked system that includes a computing device configured to generate status messages indicating a state of a client-side sync manager, in accordance with an example embodiment.

The components of an error handling system may be configured in various ways, and may operate in various ways to perform their functions. For instance, FIG. 2 is a flowchart 200 of a computer-implemented method of providing status messages regarding a client-side sync manager, in accordance with an example embodiment. Flowchart 200 may be performed by client device 102 of system 100. Flowchart 200 is described as follows with respect to FIG. 3. FIG. 3 is a block diagram of a networked system 300 that includes a computing device configured to generate status messages indicating a state of a client-side sync manager, in accordance with an example embodiment. System 300 is an example of system 100 of FIG. 1. As shown in FIG. 3, system 300 includes client device 102, network-based service provider 104, a telemetry destination server 312, and a user interface manager 314. Client device 102 includes local file system access manager 116, which includes status interface 112, client-side sync manager 114, application 118, and a file system 306. Network-based service provider 104 includes server-side sync manager 110 and a file system 308. Client-side sync manager 114 includes a status messenger 302 and a startup manager 304. Application 118 includes a status caller 310. Although flowchart 200 is described as follows with reference to various components of system 300, it will be appreciated that the method of flowchart 200 may be performed by other structural embodiments.

Flowchart 200 begins with step 202. In step 202, a status message is received from a client-side sync manager of a computing device that communicates with a server-side sync manager at a server to synchronize data objects stored in first storage of the computing device with data objects stored in second storage at the server. The status message corresponds to a state of the client-side sync manager during a multi-stage start-up process for the client-side sync manager. In an embodiment, step 202 may be performed by status interface 112 in client device 102. As shown in FIG. 3, status interface 112 in local file access manager 116 receives a status message 316 from status messenger 302 in client-side sync manager 114. Status message 316 relates to a state of client-side sync manager 114, and its ability to provide access to synchronized data objects stored in file systems 306 and 308.

In particular, file system 306 contains local copies of data objects whose access at client device 102 is managed by local file system access manager 116, and that are synchronized with data objects stored in file system 308 at network-based service provider 104. Server-side sync manager 110 and client-side sync manager 114 work together to synchronize copies of data objects stored in file system 308 with copies of the files stored in local file system 306.

Startup manager 304 manages a multi-stage start-up process for client-side sync manager 114. In an embodiment, the multi-stage start-up process may proceed through a progression of states including: (1) start of a sign-in process of the client-side sync manager; (2) completion of the sign-in process; (3) a policy document made available to client-side sync manager 114; (4) all available policy documents made available to client-side sync manager 114; (5)

completion of mounting of a folder in file system 306 for synchronization; and (6) completion of mounting all folders in file system 306 for synchronization. In other implementations, the multi-stage startup process may include additional states and/or alternative states. During each of these states, client-side sync manager 114 is not capable of responding to a direct request from an application through local file access manager 116 for a status update.

Status messenger 302 monitors the status of startup manager 304. As various stages of the multi-stage start-up process for client-side sync manager 114 managed by startup manager 304 are reached and completed, startup manager 304 generates a status message regarding the client-side sync manager's progress. As each status message is generated, status messenger 302 may send the status message as status message 316 to status interface 112 in local file system access manager 116 for storage. For example, status message 316 may be transmitted as a status notification API call to status interface 112, or may be provided according to any other communication mechanism or protocol. The status messages are stored at status interface 112 such that status information based on the messages can be retrieved from local file system access manager 116 by an application 118.

A variety of status messages may be generated by status messenger 302 as it monitors the multi-stage startup process of client-side sync manager 114. For example, the status message may indicate client-side sync manager 114 failed to start, client-side sync manager 114 never connected to local file access manager 116, client-side sync manager 114 crashed unexpectedly, or client-side sync manager 114 intentionally disconnected. Additional potential status messages include but are not limited to: client-side sync manager 114 up and running, client-side sync manager 114 trying to connect, client-side sync manager 114 connected, client-side sync manager 114 did not connect, user exit, no network available, network time out, client-side sync manager 114 restarting etc. In various embodiments, the status message may include a state representation, a string and/or a sync root path.

For example, in one scenario, prior to connection to local file access manager 116, status messenger 302 may generate a status message a minimum of three times: shortly after the client-side sync manager process launch, after client-side sync manager 114 connects to local file system access manager 116 and after the point where client-side sync manager 114 should have connected to local file system access manager 116, but didn't because a policy or setting was off. Alternatively, the status message can be generated once per sync root or folder mounting.

In a second exemplary scenario, client-side sync manager 114 uses status messenger 302 (e.g. filter API) to send status messages prior to connection to local file system access manager 116, but as soon as the synchronization process starts. In such a scenario, starting from boot, client-side sync manager 114 uses status messenger 302 to send periodic status updates to status interface 112.

In step 204, status information of the received status message is provided to an entity. In an embodiment, step 204 may be performed by status interface 112 in client device 102. In FIG. 3, status interface 112 in local file access manager 116 may provide status message 316 to status caller 310 of application 118, telemetry destination server 312 and/or user interface manager 314.

In an embodiment, application 118 may include status caller 310 that is configured to retrieve the stored status message, or a portion thereof, as status information 318 from status interface 112. Status caller 310 retrieves status information 318 from status interface 112. Status caller 310 may request status information 318 from status interface 112 in response to receiving a generic error or special error code from local file system access manager 116 during a startup process of client-side sync manager 114. For example, application 118 may request a file in file system 306 and receive an error that indicates that client-side sync manager 114 has not fully connected to local file system access manager 116 (e.g., OS calls "CfHydratePlaceholder", "CfHydratePlaceholder" returns a "PROVIDER NOT RUNNING" error). In response to receiving the error, application 118 knows that client-side sync manager 114 has not fully connected to local file system access manager 116. Status caller 310 then retrieves the most recent status information from status interface 112 where it has been placed by client-side sync manager 114 (e.g., status caller 310 retrieves the extended error via an API call to a "CfQuerySyncProviderStatus" or "CfGetLastSyncStatus" API of status interface 112).

Telemetry destination server 312 may receive status information 318 as telemetry (collected data) from client device 102. Telemetry destination server 312 may be a server, personal computer, virtual machine or any other type of computing device or application that receives the telemetry from client device 102. Status information 318 may be accessed at telemetry destination server 312 by developers or debuggers who are developing and/or troubleshooting the file syncing service, enabling them to make improvements or corrections to the hardware, software, and/or firmware of the file syncing service.

User interface manager 314 may receive status information 318 from client device 102 for display by a graphic user interface (GUI) at client device 102. User interface manager 314 can format status information 318 as needed for a particular type of display or device. Status information 318 can then be presented in a dialog box to inform a user about any delay in accessing a data object, and/or to assist the user in identifying and remediating any problems that may occur during the startup process of the client-side sync manager 114.

Figure 4:
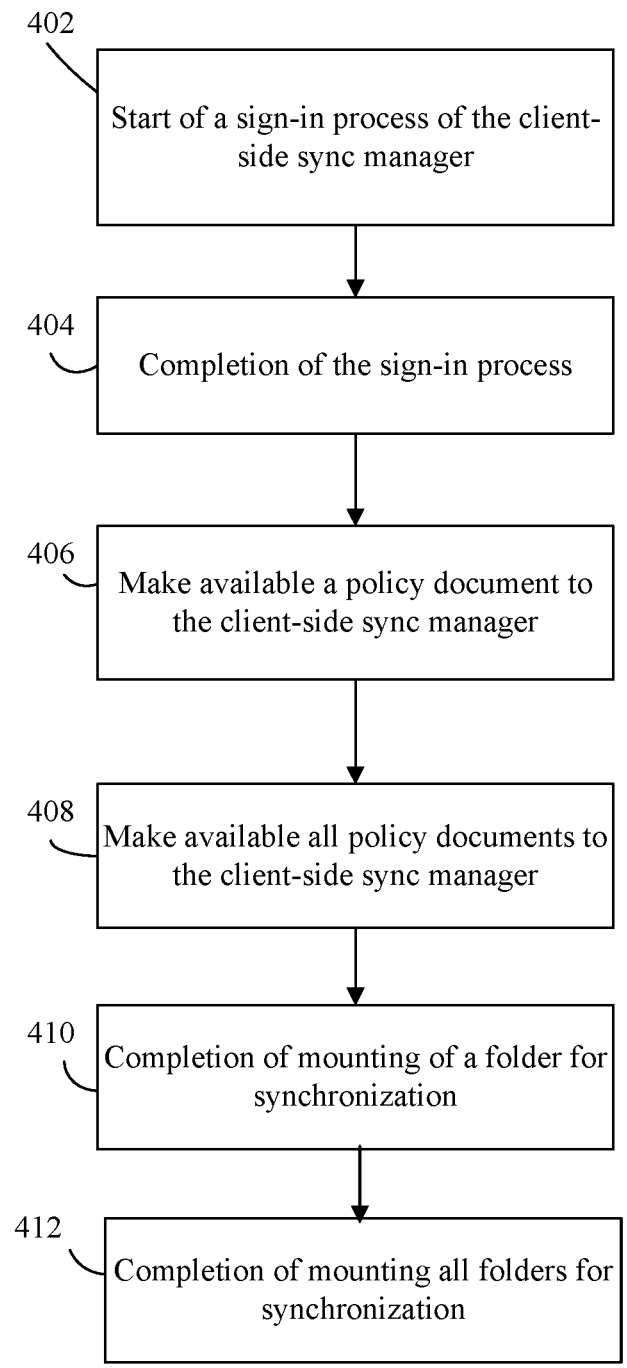
FIG. 4 is a flowchart of a multi-stage start-up process for a client-side sync manager, in accordance with an example embodiment.

As described above, the multi-state startup process for client-side sync manager 114 may include any number, variety, and order of startup states. For instance, FIG. 4 is a flowchart 400 of a multi-stage start-up process for client-side sync manager 114, in accordance with an example embodiment. Client-side sync manager 114 may proceed through flowchart 400, and during each stage of the start-up process, a corresponding status message may be generated that is sent to status interface 112, which may be provided to or retrieved by an application with access to local file system access manager 116.

For example, in step 402, a sign-in process of the client-side sync manager is started. In response to the starting of the sign-in process, a corresponding status message 316 may be generated by status messenger 302 that is sent to status interface 112, which may be transmitted to or retrieved by an application with access to the local file system access manager. In an embodiment, the earliest client-side sync manager 114 may be able to call a notification API of status interface 112 to provide status message 316 may be the "sign in starts" stage of the multi-stage process. At the start of the sign-in stage, the corresponding ring ramps (or other logic) become available that enable (or not) performing each of the start-up processes described herein in client-side sync manager 114, as well as initiating the execution of status messenger 302. The start-up process then proceeds to step 404.

In step 404, the sign-in process is completed. In response to completion of the sign-in process, status message 316 indicating the progress through the process may be generated by status messenger 302 and sent to status interface 112. The start-up process then continues its progression to step 406.

In step 406, a policy document is made available to the client-side sync manager. In response to the availability of a policy document, status message 316 indicating the availability of the policy document may be generated by status messenger 302 and sent to status interface 112. Note that a policy document defines policy settings for the file syncing service to be managed by client-side sync manager 114. Examples of such policies include defaults for enabling saving of files in sync folders of file system 306, for automatically synchronizing (copying or not copying) of documents stored in a local sync folder of file system 306 to file system 308, for whether or not to synchronize files over a metered network connection, for setting of maximum upload bandwidth, for configuring of maximum storage size for automatic file download, maximum data chunk size for upload/download, enabling/disabling synchronizing of accounts for specific organizations, for which ring ramp code to turn on or off, for other configuration values, etc. Multiple policy documents may be present that each define a corresponding set/type of policies. The start-up process then proceeds to step 408.

In step 408, all policy documents are made available to the client-side sync. In response to the availability of all policy documents (when multiple policy documents are present), status message 316 indicating the availability of the policy documents may be generated by status messenger 302 and sent to status interface 112. Step 402 may also be the point at which the normal ramps of the synchronization process become available. The start-up process then proceeds to step 410.

In step 410, mounting of a folder for synchronization is completed. In response to the completion of the mounting of a folder of file system 306, such that the folder is mapped to and configured for synchronizing with a corresponding folder of file system 308, status message 316 indicating the mounting of the folder has been completed may be generated by status messenger 302 and sent to status interface 112. The start-up process then proceeds to step 412.

In step 412, mounting all folders for synchronization is completed. In response to the completion of the mounting of all the folders of file system 306, such that the folders are each mapped to and configured for synchronizing with a corresponding folder of file system 308, status message 316 indicating the mounting of all the folders may be generated by status messenger 302 and sent to status interface 112. In some embodiments, a status message indicating the mounting of all folders is not sent because a separate status messages is sent for each folder mounting (e.g., as in step 410). At this point, client-side sync manager 114 should be fully connected to local file system access manager 116 such that error handling and status messaging can be accomplished through direct communications between client-side sync manager 114 and the requesting entity though local file system access manager 116.

Informing the local platform of each of the different states shown in FIG. 4, allows for a more granular telemetry and error reporting system for client-side sync manager 114. As discussed above, the earliest cloud storage provider may be able to call any notification API may be the "sign in starts" stage. At this stage, the ring ramps corresponding to each start-up process of client-side sync manager 114 are available. The ring ramp document may be cached, so if the network is unavailable, the start-up process may fall back on the last known ring ramp document.

Figure 5:
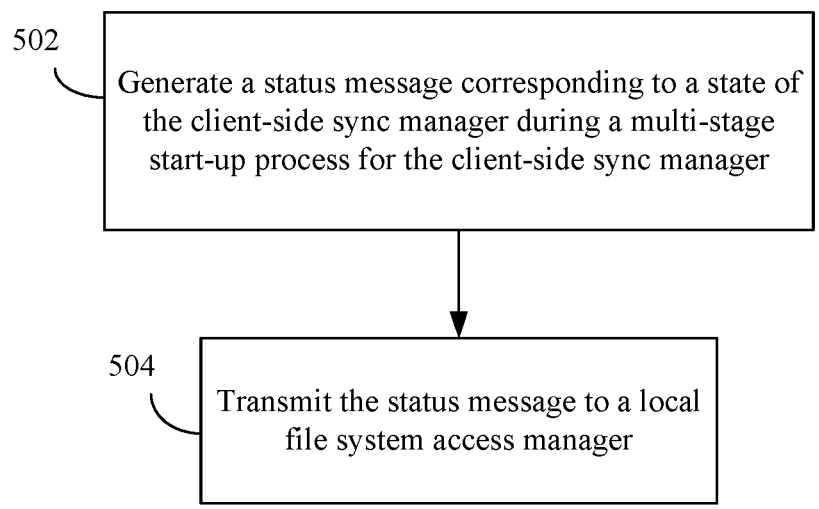
FIG. 5 is a flowchart of a computer-implemented method of generating status messages regarding a client-side sync manager, in accordance with an example embodiment.

Thus, as described with respect to FIG. 4, status messages indicating a status of client-side sync manager 114 may be generated and provided to status interface 112. Such status messages may be generated by status messenger 302 in any manner. For instance, FIG. 5 is a flowchart 500 of a process for generating status messages regarding a client-side sync manager, in accordance with an example embodiment. Flowchart 500 may be performed by status messenger 302. Other structural and operational embodiments will be apparent to persons skilled in the relevant art(s) based on the following discussion regarding flowchart 500.

Flowchart 500 begins in step 502. In step 502, a status message corresponding to a state of the client-side sync manager during a multi-stage start-up process for the client-side sync manager is generated. As discussed herein, the status message may be generated by status messenger 302 automatically during any of multiple stages of the multi-stage start-up process for client-side sync manager 114, including at the beginning, middle, or completion phases of each stage. Each status message includes contents configured to detail the corresponding state/stage of client-side sync manager 114.

In step 504, the status message is transmitted to a local file system access manager. For instance, as shown in FIG. 3, status messenger 302 may transmit status message 316 to status interface 112 of local file system access manager 116. For instance, status messenger 302 may provide status message 316 in the form of an API call to a notification API of status interface 112. By providing status message 316, applications with access to local file system access manager 116 are enabled to retrieve status information 318 from status interface 112 prior to having direct access to client-side sync manager 114.

Figure 6:
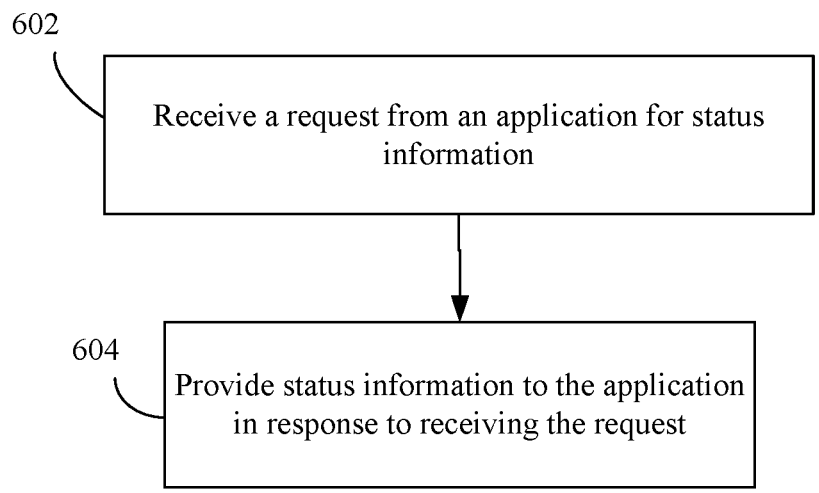
FIG. 6 is a flowchart of a computer-implemented method of responding to a request of an application for a status of a client-side sync manager, in accordance with an example embodiment.

For example, FIG. 6 is a flowchart 600 of a process for responding to a request of an application for a status of a client-side sync manager, in accordance with an example embodiment. Flowchart 600 may be performed by status interface 112. Other structural and operational embodiments will be apparent to persons skilled in the relevant art(s) based on the following discussion regarding flowchart 600.

Flowchart 600 begins in step 602. In step 602, a request from an application for status information is received. For example, as shown in FIG. 3, status caller 310 of application 118 may generate a status request 320 that is provided to status interface 112. Status request 320 may be generated to have any suitable form, including as an API call to a status access API of status interface 112. As described above, application 118 executes in client device 102, and may be any type of application, including an OS of client device 102, a document editor application, a media presentation application, etc. Any number of applications in client device 102 may be configured to generate status requests provided to status interface 112 to obtain a status of client-side sync manager 114. In an embodiment, application 118 may issue status request 320 in response to an error received from local file system access manager 116 due to a failed attempt to access a synchronized file in file system 306, including a file in a dehydrated state.

In step 604, status information is provided to the application in response to receiving the request. As shown in FIG. 3, status interface 112 transmits status information 318 to status caller 310 in application 118. Status information 318 may be provided in any form, including in the form of an API call response. Status information 318 includes status information obtained from the latest status message received by status interface 112 (e.g., with extraneous message information stripped out, such as a header of status message 316), and indicates a state/status of client-side sync manager 114. For example, status information 318 may indicate one or more of the following states of client-side sync manager 114: disconnected from server-side, idle, populate namespace, populate metadata, populate content, sync incremental, sync full, connectivity lost, error, clear flags, terminated, etc.

Note that although FIG. 3 shows application 118 providing status request 320 to status interface 112, in other instances, status request 320 may be received from telemetry destination server 312 or user interface manager 314.

Figure 7:
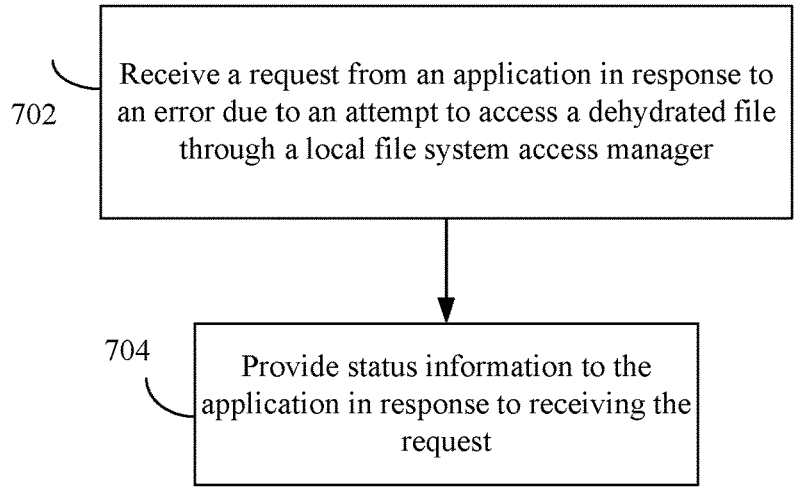
FIG. 7 is a flowchart of a computer-implemented method of responding to a request of an application for a status of a client-side sync manager in response to a failed file access attempt, in accordance with an example embodiment.

As mentioned above with regard to FIG. 6, status request 320 may be generated in response to an error in a dehydrated file access attempt by an application or other entity. For instance, FIG. 7 is a flowchart 700 of a process for responding to a request of an application for a status of a client-side sync manager in response to a failed file access attempt, in accordance with an example embodiment. Flowchart 700 may be performed by status interface 112, and is described as follows.

Flowchart 700 begins in step 702. In step 702, a request is received from an application in response to an error due to an attempt to access a dehydrated file through a local file system access manager. For example, in response to an error in attempting to access a dehydrated file, application 118 may receive a generic error (e.g., "PROVIDER NOT RUNNING") that prompts application 118 to call status interface 112. As such, status caller 310 of application 118 provides status request 320 to status interface 112.

In step 704, status information is provided to the application in response to receiving the request. As described above, status interface 112 transmits status information 318 to status caller 310. Status information 318 may indicate any of the errors mentioned herein, including an indication that the requested file is dehydrated, and therefore client-side sync manager 114 is in the process of attempting to hydrate the file in file system 306. To hydrate the file, client-side sync manager 114 transmits a request to server-side sync manager 110 to access the file in file system 308, and transmit the requested file to client-side sync manager 114 for storage in file system 306. Once the file is hydrated in file system 306, application 118 is provided access to the file and no longer receives an access error.

Figure 8A:
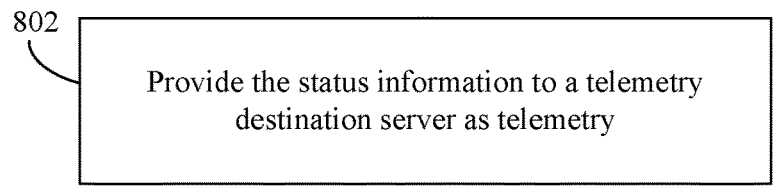
FIGS. 8A and 8B are flowcharts of computer-implemented methods of providing status information regarding a client-side sync manager to a telemetry server and user interface manager, respectively, in accordance with example embodiments.

Note that as described elsewhere herein, a state/status of client-side sync manager 114 may be transmitted to a remote telemetry server for the purpose of further developing and/or troubleshooting the file syncing service, helping to enable corrections and/or improvements to be made to the file syncing service. For instance, FIG. 8A is a flowchart 800 of a process for providing status information regarding a client-side sync manager to a telemetry server, in accordance with an example embodiment. Flowchart 800 may be performed by status interface 112. Other structural and operational embodiments will be apparent to persons skilled in the relevant art(s) based on the following discussion regarding flowchart 800.

Flowchart 800 begins with step 802. In step 802, the status information is provided to a telemetry destination server as telemetry. For example, as shown in FIG. 3, status information 318 is transmitted to telemetry destination server 312, which may be a computing device that client device 102 may communicate with over a network. Status information 318 may be transmitted to telemetry destination server 312 in response to a status request from telemetry destination server 312, or may be transmitted on another basis, such as according to a schedule (e.g., periodically), when a particular error is indicated in the most recent status message received by status interface 112, when a particular indicated error has been indicated in status messages a predetermined number of times, in response to a command from the local OS, and/or on any other suitable basis. Status information 318 may include any of the status/state/error indications mentioned herein or otherwise known to persons skilled in the relevant art(s) based on the teachings herein. Status information 318 can then be used at telemetry destination server 312 (e.g., by developers) to diagnose any issues that arise during the multi-stage startup process of the client-side sync manager 114, and/or to diagnose other problems.

Figure 8B:
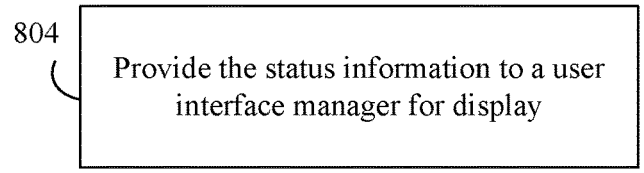

In another embodiment, the state/status of client-side sync manager 114 may be transmitted for display to a user of client device 102. In this manner, a user may be informed of the accessibility of synchronized files, and/or any problems with file synchronization. For instance, FIG. 8B is a flowchart 810 of a process for providing status information regarding a client-side sync manager to a user interface manager, in accordance with an example embodiment. Flowchart 810 may be performed by status interface 112. Other structural and operational embodiments will be apparent to persons skilled in the relevant art(s) based on the following discussion regarding flowchart 810.

Flowchart 810 begins with step 804. In step 804, the status information is provided to a user interface manager for display (e.g., OS presents error string in dialog box). For example, as shown in FIG. 3, status information 318 is transmitted to user interface manager 314. User interface manager 314 may be a user interface manager for an operating system of client device 102, in an embodiment, and therefore may manage aspects of user interfaces displayed by one or more display screens associated with client device 102. User interface manager 314 may display status information 318 in any manner, such as in a graphical user interface (GUI), such as a window, a pop-up, etc. In this manner, a user of client device 102 can assess operation of client-side sync manager 114, and be informed whether client-side sync manager 114 is undergoing any problems, whether such problems are temporary (e.g., the normal start-up process) or may need addressing, etc. User interface manager 314 can format status information 318 as needed for any particular type of use, display, program or device.

Accordingly, embodiments enable insight to operating systems, applications, telemetry servers, and users into the state of a file syncing service. This may include progress by the client-side sync manager of the file syncing service in starting up until fully executing, any issues in communicating with the server-side sync manager, and any other problems, errors, etc. Such embodiments enable improved client device operation by reducing application re-tries at synced file accesses (e.g., enabling applications to wait until the client-side sync manager indicates via status messages that it is fully operating, desired files are hydrated, etc., rather than repeated retrying access attempts), thereby enabling greater efficiency in processor execution and memory management. Furthermore, by transmitting status information to a telemetry server, developers are enabled to debug and improve file sync service operation.

Example Computer System Implementation

Any of the components of client device 102 of FIGS. 1 and 3, including network-based service provider 104, server-side sync manager 110, status interface 112, client-side sync manager 114, local file system access manager 116, status messenger 302, startup manager 304, status caller 310, telemetry destination server 312, user interface manager 314, and any of the steps of the flowcharts of FIGS. 2 and 4-8B may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
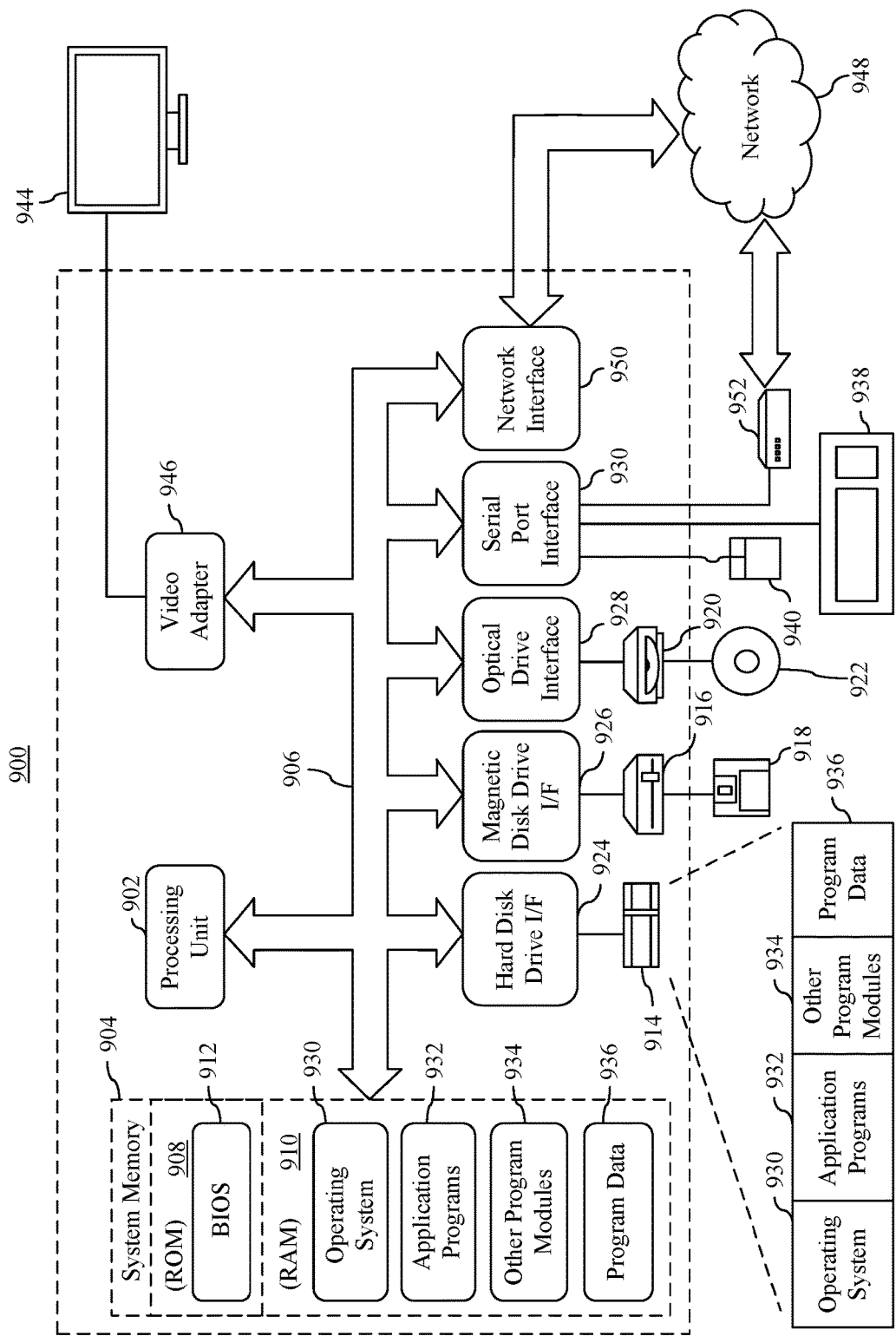
FIG. 9 depicts an example processor-based computer system that may be used to implement various embodiments described herein.

FIG. 9 depicts an example processor-based computer system 900 that may be used to implement various embodiments described herein. For example, system 900 may be used to implement client device 102 and a server that includes network-based service provider 104 as described above. The description of system 900 provided herein is provided for purposes of illustration, and is not intended to be limiting. Embodiments may be implemented in further types of computer systems, as would be known to persons skilled in the relevant art(s).

As shown in FIG. 9, system 900 includes a processing unit 902, a system memory 904, and a bus 906 that couples various system components including system memory 904 to processing unit 902. Processing unit 902 may comprise one or more microprocessors or microprocessor cores. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

System 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, BLU-RAY™ disk or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules or components may be stored on the hard disk, magnetic disk, optical disk, ROM, or RAM. These program modules include an operating system 930, one or more application programs 932, other program modules 934, and program data 936. In accordance with various embodiments, the program modules may include computer program logic (e.g. executable program instructions) that is executable by processing unit 902 to perform any or all the functions and features of client device 102 as described above, including network-based service provider 104, server-side sync manager 110, status interface 112, client-side sync manager 114, local file system access manager 116, status messenger 302, startup manager 304, status caller 310, telemetry destination server 312, user interface manager 314, flowchart 200, flowchart 400, flowchart 500, flowchart 600, flowchart 700, flowchart 800, and/or flowchart 810 (including any one or more steps of flowcharts 200, 400, 500, 600, 700, 800, and/or 810).

A user may enter commands and information into system 900 through input devices such as a keyboard 938 and a pointing device 940. Other input devices (not shown) may include a microphone, joystick, game controller, scanner, or the like. In one embodiment, a touch screen is provided in conjunction with a display 944 to allow a user to provide user input via the application of a touch (as by a finger or stylus for example) to one or more points on the touch screen. These and other input devices are often connected to processing unit 902 through a serial port interface 942 that is coupled to bus 906, but may be connected by other interfaces, such as a parallel port, game port, or a universal serial bus (USB). Such interfaces may be wired or wireless interfaces.

A display 944 is also connected to bus 906 via an interface, such as a video adapter 946. In addition to display 944, system 900 may include other peripheral output devices (not shown) such as speakers and printers.

System 900 is connected to a network 948 (e.g., a local area network or wide area network such as the Internet) through a network interface or adapter 950, a modem 952, or other suitable means for establishing communications over the network. Modem 952, which may be internal or external, is connected to bus 906 via serial port interface 942. As used herein, the terms "computer program medium," "computer-readable medium," and "computer-readable storage medium" are used to generally refer to memory devices or storage structures such as the hard disk associated with hard disk drive 914, removable magnetic disk 918, removable optical disk 922, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950, serial port interface 942, or any other interface type. Such computer programs, when executed or loaded by an application, enable system 900 to implement features of embodiments of the present methods and systems discussed herein. Accordingly, such computer programs represent controllers of the system 900.

Embodiments are also directed to computer program products comprising software stored on any computer useable medium. Such software, when executed in one or more data processing devices, causes a data processing device(s) to operate as described herein. Embodiments of the present methods and systems employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

Additional Exemplary Embodiments

In an embodiment, a computing device provides status messages indicating a status of a client-side sync manager. The computing device comprises one or more memory devices that store executable program instructions and one or more processors operable to access the memory device(s) and to execute the executable program instructions. The executable program instructions comprise a local file system access manager that includes a status interface configured to receive a status message from a client-side sync manager of the computing device that communicates with a server-side sync manager at a server to synchronize data objects stored in first storage of the computing device with data objects stored in second storage at the server, the status message corresponding to a state of the client-side sync manager during a multi-stage start-up process for the client-side sync manager, the status interface further configured to provide status information of the received status message to an entity.

In an embodiment, the entity is an application executing in the computing device, the status interface further configured to receive a request from the application for the status information and, in response to receiving the request, to provide the status information to the application.

In an embodiment, the application is a user interface manager of the computing device, the status interface further configured to provide the status information to the user interface manager for display.

In an embodiment, the application issues the request to the status interface in response to an error due to an attempt to access a dehydrated file in the first storage through the local file system access manager.

In an embodiment, the status message from the client-side sync manager indicates for the error at least one of: disconnected; idle; populate namespace; populate metadata; populate content; sync incremental; sync full; connectivity lost; error; clear flags; or terminated.

In an embodiment, the entity is a telemetry destination server and the status interface is configured to provide the status information to the telemetry destination server as telemetry.

In an embodiment, the multi-stage start-up process includes one or more of the states of: start of a sign-in process of the client-side sync manager; completion of the sign-in process; failure of the sign-in process; availability of all available policy documents to the client-side sync manager; completion of connecting a folder to the file system access manager for synchronization; or failure of connecting a folder to the file system access manager for synchronization.

In an embodiment, a computer-implemented method of providing status messages regarding a service provider comprises receiving a status message from a client-side sync manager of a computing device that communicates with a server-side sync manager at a server to synchronize data objects stored in first storage of the computing device with data objects stored in second storage at the server, the status message corresponding to a state of the client-side sync manager during a multi-stage start-up process for the client-side sync manager; and providing status information of the received status message to an entity.

In an embodiment, the entity is an application executing in the computing device, and said providing comprises receiving a request from the application for the status information, and providing the status information to the application in response to receiving the request.

In an embodiment, the application is a user interface manager of the computing device, and said providing comprises providing the status information to the user interface manager for display.

In an embodiment, said receiving a request from the application for the status information comprises receiving the request from the application in response to an error due to an attempt to access a file in the first storage through a local file system access manager.

In an embodiment, said receiving a status message comprises receiving the status message from the client-side sync manager indicating for the error at least one of: disconnected; idle; populate namespace; populate metadata; populate content; sync incremental; sync full; connectivity lost; error; clear flags; or terminated.

In an embodiment, the entity is a telemetry destination server, and said providing comprises providing the status information to the telemetry destination server as telemetry.

In an embodiment, the multi-stage start-up process comprises at least one or more of: starting of a sign-in process of the client-side sync manager; completing of the sign-in process; failing of the sign-in process; making available all available policy documents to the client-side sync manager; completing connection of a folder to the file system access manager for synchronization; or failing to connect a folder to the file system access manager for synchronization.

In an embodiment, a computing device provides status messages regarding a service provider. The computing device comprises one or more memory devices that store executable program instructions and one or more processors operable to access the memory device(s) and to execute the executable program instructions. The executable program instructions comprise a client-side sync manager that communicates with a server-side sync manager at a server to synchronize data objects stored in first storage of the computing device with data objects stored in second storage at the server. The client-side sync manager comprises a startup manager configured to manage a multi-stage start-up process for the client-side sync manager and a status messenger configured to generate a status message corresponding to a state of the client-side sync manager during the multi-stage start-up process, and transmit the status message to a local file system access manager.

In an embodiment, the multi-stage start-up process includes one or more of the states of: start of a sign-in process of the client-side sync manager; completion of the sign-in process; failure of the sign-in process; availability of all available policy documents to the client-side sync manager; completion of connecting a folder to the file system access manager for synchronization; or failure of connecting a folder to the file system access manager for synchronization.

In an embodiment, the status message indicates at least one of: disconnected; idle; populate namespace; populate metadata; populate content; sync incremental; sync full; connectivity lost; error; clear flags; or terminated.

In an embodiment, the executable program instructions further comprise a status interface configured to receive the status message and provide status information of the received status message to an entity.

In an embodiment, the entity is a telemetry destination server and the status interface is configured to provide the status information to the telemetry destination server as telemetry.

In an embodiment, the entity is a user interface manager of the computing device and the status interface is configured to provide the status information to the user interface manager for display.

The example embodiments described herein are provided for illustrative purposes, and are not limiting. The examples described herein may be adapted to any type of system or method. Further structural and operational embodiments, including modifications/alterations, will become apparent to persons skilled in the relevant art(s) from the teachings herein.

CONCLUSION

While various embodiments of the present methods and systems have been described above, it should be understood that they have been presented by way of example only, and not limitation. It will be apparent to persons skilled in the relevant art that various changes in form and detail can be made therein without departing from the spirit and scope of the methods and systems. Thus, the breadth and scope of the present methods and systems should not be limited by any of the above-described exemplary embodiments, but should be defined only in accordance with the following claims and their equivalents.

What is claimed is:

1. A computing device for providing status messages indicating a status of a client-side sync manager, the computing device comprising:
   one or more memory devices that store executable program instructions; and
   one or more processors operable to access the memory device(s) and to execute the executable program instructions, the executable program instructions comprising:
      a local file system access manager that includes
         a status interface configured to receive a status message from a client-side sync manager of the computing device that communicates with a server-side sync manager at a server to synchronize data objects stored in first storage of the computing device with data objects stored in second storage at the server, the status message corresponding to a state of the client-side sync manager during a multi-stage start-up process for the client-side sync manager, the status interface further configured to provide status information of the received status message to an entity.

2. The computing device of claim 1, wherein the entity is an application executing in the computing device, the status interface further configured to receive a request from the application for the status information and, in response to receiving the request, to provide the status information to the application.

3. The computing device of claim 2, wherein the application is a user interface manager of the computing device, the status interface further configured to provide the status information to the user interface manager for display.

4. The computing device of claim 2, wherein the application issues the request to the status interface in response to an error due to an attempt to access a file in the first storage through the local file system access manager.

5. The computing device of claim 4, wherein the status message from the client-side sync manager indicates for the error at least one of:
   disconnected;
   idle;
   populate namespace;
   populate metadata;
   populate content;
   sync incremental;
   sync full;
   connectivity lost;
   error;
   clear flags; or
   terminated.

6. The computing device of claim 1, wherein the entity is a telemetry destination server, the status interface configured to provide the status information to the telemetry destination server as telemetry.

7. The computing device of claim 1, wherein the multi-stage start-up process includes one or more of the states of:
   start of a sign-in process of the client-side sync manager;
   completion of the sign-in process;
   failure in the sign-in process;
   availability of all available policy documents to the client-side sync manager;
   completion of connecting a folder to the file system access manager for synchronization; or
   failure in connecting a folder to the file system access manager for synchronization.

8. A computer-implemented method of providing status messages regarding a service provider, comprising:
   receiving a status message from a client-side sync manager of a computing device that communicates with a server-side sync manager at a server to synchronize data objects stored in first storage of the computing device with data objects stored in second storage at the server, the status message corresponding to a state of the client-side sync manager during a multi-stage start-up process for the client-side sync manager; and
   providing status information of the received status message to an entity.

9. The method of claim 8, wherein the entity is an application executing in the computing device, and said providing comprises:
   receiving a request from the application for the status information, and
   providing the status information to the application in response to receiving the request.

10. The method of claim 9, wherein the application is a user interface manager of the computing device, and said providing comprises:
    providing the status information to the user interface manager for display.

11. The method of claim 9, wherein said receiving a request from the application for the status information comprises:
    receiving the request from the application in response to an error due to an attempt to access a dehydrated file in the first storage through a local file system access manager.

12. The method of claim 11, wherein said receiving a status message comprises:
    receiving the status message from the client-side sync manager indicating for the error at least one of:
    disconnected;

idle;
populate namespace;
populate metadata;
populate content;
sync incremental;
sync full;
connectivity lost;
error;
clear flags; or
terminated.

13. The method of claim 8, wherein the entity is a telemetry destination server, and said providing comprises:
   providing the status information to the telemetry destination server as telemetry.

14. The method of claim 8, wherein the multi-stage start-up process comprises at least one or more of:
   starting of a sign-in process of the client-side sync manager;
   completing of the sign-in process;
   failing of the sign-in process;
   making available all available policy documents to the client-side sync manager;
   completing connection of a folder to the file system access manager for synchronization; or
   failing to connect a folder to the file system access manager for synchronization.

15. A computing device for providing status messages regarding a service provider, the computing device comprising:
   one or more memory devices that store executable program instructions; and
   one or more processors operable to access the memory device(s) and to execute the executable program instructions, the executable program instructions comprising:
      a client-side sync manager that communicates with a server-side sync manager at a server to synchronize data objects stored in first storage of the computing device with data objects stored in second storage at the server, the client-side sync manager comprising:
         a startup manager configured to manage a multi-stage start-up process for the client-side sync manager; and
         a status messenger configured to
            generate a status message corresponding to a state of the client-side sync manager during the multi-stage start-up process, and
            transmit the status message to a local file system access manager.

16. The computing device of claim 15, wherein the multi-stage start-up process includes one or more of the states of:
   start of a sign-in process of the client-side sync manager;
   completion of the sign-in process;
   failure of the sign-in process;
   availability of all available policy documents to the client-side sync manager;
   completion of connecting a folder to the file system access manager for synchronization; or
   failure of connecting a folder to the file system access manager for synchronization.

17. The computing device of claim 15, wherein the status message indicates at least one of:
   disconnected;
   idle;
   populate namespace;
   populate metadata;
   populate content;
   sync incremental;
   sync full;
   connectivity lost;
   error;
   clear flags; or
   terminated.

18. The computing device of claim 15, wherein the executable program instructions further comprise:
   a status interface configured to receive the status message and provide status information of the received status message to an entity.

19. The computing device of claim 18, wherein the entity is a telemetry destination server, the status interface configured to provide the status information to the telemetry destination server as telemetry.

20. The computing device of claim 18, wherein the entity is a user interface manager of the computing device, the status interface configured to provide the status information to the user interface manager for display.

* * * * *